United States Patent [19]
Huppenthal

[11] Patent Number: 6,163,642
[45] Date of Patent: Dec. 19, 2000

[54] OPTICAL TRANSMITTER/RECEIVER INTERFACE FOR SEALED ENVIRONMENTS AND METHOD OF USING SAME

[75] Inventor: Jon M. Huppenthal, Colorado Springs, Colo.

[73] Assignee: Medallion Technology, LLC, Houston, Tex.

[21] Appl. No.: 08/791,837

[22] Filed: Jan. 30, 1997

Related U.S. Application Data

[63] Continuation of application No. 08/599,893, Feb. 12, 1996, abandoned.

[51] Int. Cl.$^7$ ....................................................... G02B 6/00
[52] U.S. Cl. ............................ 385/138; 385/139; 385/24; 385/31; 385/88; 385/89; 385/14
[58] Field of Search ................................. 385/14, 15, 24, 385/31, 33, 59, 88, 89, 137, 138, 139

[56] References Cited

U.S. PATENT DOCUMENTS

| | | | |
|---|---|---|---|
| 3,398,289 | 8/1968 | Brewster | 385/147 X |
| 3,951,515 | 4/1976 | Allard | 385/138 X |
| 4,360,249 | 11/1982 | Slemon | 385/138 X |
| 4,548,465 | 10/1985 | White | 385/138 X |
| 4,682,846 | 7/1987 | Cowen | 385/138 X |
| 4,708,431 | 11/1987 | Pikulski et al. | 385/138 X |
| 4,759,601 | 7/1988 | Knutsen et al. | 385/138 X |
| 4,859,021 | 8/1989 | Wall | 385/138 X |
| 4,915,470 | 4/1990 | Moore et al. | 385/94 X |
| 5,093,879 | 3/1992 | Bregman et al. | 385/93 |
| 5,101,460 | 3/1992 | Richard | 385/37 |
| 5,113,475 | 5/1992 | Baker | 385/138 X |
| 5,241,612 | 8/1993 | Takeo | 385/74 |
| 5,436,997 | 7/1995 | Makiuchi et al. | 385/92 |

(List continued on next page.)

FOREIGN PATENT DOCUMENTS 0463390  1/1992  European Pat. Off. ............. 385/33 X

OTHER PUBLICATIONS

J. Huppenthal, et al., "Free–Space Optoelectronic Modules for High–Density High–Speed Interconnections", submitted to the Defense Advanced Research Projects Agency, (Dec. 8, 1993).

J. Huppenthal, et al., "Free–Space, Opto–Electronic Modules for High–Density, High–Speed Inter–Connections", submitted to the Defense Advanced Research Projects Agency, (May 19, 1994).

D.Z. Tsang, "One–gigabit per second free–space optical interconnection", *Applied Optics*, 29:14, 2034–2037 (1990).

D.Z. Tsang, et al., "High–Speed High–Density Parallel Free–Space Optical Interconnections", *LEOS '94 7th Annual Meeting*, vol. 1, (Oct. 31–Nov. 3, 1994).

D.Z. Tsang, "Optical Interconnections for Digital Systems", *IEEE*, 9–1—9–6 (1992).

D.Z. Tsang, et al., "Free–space optical interconnection technology in parallel processing systems", *Optical Engineering*, 33:5, 1524–1531 (1994).

(List continued on next page.)

*Primary Examiner*—Brian Healy
*Attorney, Agent, or Firm*—John R. Ley; Roger Fulghum

[57] ABSTRACT

An optical interface includes at least two transmitters and receivers capable of transmitting and receiving, respectively, high bandwidth optical signals. A first transmitter/receiver assembly which includes at least one such transmitter and one such receiver is mounted inside a computer having a shell which maintains a hermetic seal. The transmitter and receiver of the first transmitter/receiver assembly face a transparent portion of the computer shell. A second transmitter/receiver assembly also includes at least one transmitter and receiver which are mounted outside the computer shell facing the transparent portion of the shell, with each transmitter and receiver of the second transmitter/receiver assembly opposite a corresponding receiver or transmitter of the first transmitter/receiver assembly. High bandwidth optical signals of up to 1 Gb/s are transmitted to and from the computer across the transparent portion of the shell while the hermetic seal is maintained.

13 Claims, 5 Drawing Sheets

U.S. PATENT DOCUMENTS

| | | | |
|---|---|---|---|
| 5,469,518 | 11/1995 | Song et al. | 385/89 |
| 5,479,288 | 12/1995 | Ishizuka et al. | 385/94 X |
| 5,491,300 | 2/1996 | Huppenthal et al. | 174/151 |
| 5,515,467 | 5/1996 | Webb | 385/88 |
| 5,517,592 | 5/1996 | Grajewski et al. | 385/138 |

OTHER PUBLICATIONS

D.Z. Tsang, "Free–Space Optical Interconnections for Digital Systems", *LEOS '92*, Boston, MA, 440–441, (Nov. 1992).

D.Z. Tsang, "Perspectives on Optoelectronic Packaging for Optical Interconnections", Presented at GOMAC '92, Las Vegas, NV, (Nov. 11, 1992).

D.Z. Tsang, "High–Density 300–Gbps/cm2 Parallel Free–Space Optical Interconnection Design Considerations", Presented at 1995 Spring Topicals on Optical Computing, Salt Lake City, Utah, (Mar. 12–17, 1995).

"Gradient–Index Lens Optical Backplane," by Gerald F. Sauter, Applied Optics, vol. 33, No. 16, pp.34463446–34463453, Jun. 1994.

OPTICAL TRANSMITTER/RECEIVER INTERFACE FOR SEALED ENVIRONMENTS AND METHOD OF USING SAME

RELATED APPLICATION

This application is a continuation of application Ser. No. 08/599,893, filed on Feb. 12, 1996, now abandoned.

This application is related to U.S. patent application Ser. No. 08/234,253, filed Apr. 28, 1994 for PENETRATOR AND FLEXIBLE CIRCUIT ASSEMBLY FOR SEALED ENVIRONMENT, to issue Feb. 13, 1996 as U.S. Pat. No. 5,491,300.

FIELD OF THE INVENTION

This invention relates to an interface for transmission of signals to and from a sealed environment. More particularly, this invention relates to a new and improved optical interface for transmitting high speed signals to and from a sealed environment and between sealed environments.

BACKGROUND OF THE INVENTION

A variety of circumstances and situations exist where it is necessary to transmit electrical signals from one environment to another environment, and the two environments must be hermetically sealed or isolated from one another. Although satisfactory electrical connectors have been developed for many of these situations, others remain particularly difficult. For example, one such situation involves high speed, high capacity digital computers, referred to hereinafter as supercomputers.

Supercomputers generate relatively high heat densities, for example, in the range of 275 watts per cubic inch. To cool the components of supercomputers, a high density dielectric liquid coolant is delivered under pressure to and circulated over the components of the supercomputers. Because supercomputer components are submerged in the high density coolant, seals to the external environment must be maintained to control coolant flow and to contain the coolant within the supercomputer.

Transmission of high frequency signals to and from supercomputers has sometimes been achieved by using very small gage twisted wire pairs or coaxial cables. Twisted wire pairs are suitable for supercomputer signal transmission because the paired configuration achieves a controlled impedance signal path.

Twisted wire pairs, like other cables used with supercomputers, must penetrate the supercomputer cabinet through a seal. However, the insulation which surrounds the conductors of twisted wire pairs will act like a conduit through which the coolant will flow. Consequently, if the insulation is allowed to penetrate the boundary between the two environments, it becomes difficult to create and maintain a seal between the pressurized, liquid-filled interior of the cabinet and the exterior ambient environment.

To address the problem of coolant leakage via the insulation of twisted wire pairs, the insulation is stripped for a short length, each stripped conductor is physically isolated from adjacent conductors, and the separated stripped conductors are mounted in potting compound in a connector housing. Once the potting compound cures into a solid mass, the housing is mounted to the supercomputer cabinet.

Unfortunately, the fragility of the small gage conductors results in significant breaking and shorting of conductors during the stripping and mounting process. In addition, the separation of the twisted wire pairs creates discontinuities in the path impedance where the conductors are separated. Usually the integrity of the connections cannot be tested until after manufacturing of the assembly is complete. Because of the permanency of the potting compound, repairs to the twisted wire pairs are not practical.

To compensate for the expected percentage of damaged or nonfunctional twisted wire pairs, spare conductors are stripped and mounted in the potting compound. Often twice as many connections are Installed in a housing as are needed, based on the expectation that up to one half the twisted wire pairs will not transmit signals satisfactorily. This multiplies both labor and material costs for what already is a very labor intensive and costly manufacturing process.

While the above techniques address problems of maintaining seals in a supercomputer, other problems have resulted from use of the above techniques. For example, the need to manually strip each conductor and manually install the stripped conductor in physical isolation from adjacent conductors limits the number of conductors which can be closely positioned in a connector housing. This limitation on density of the conductors is exacerbated by the fact that approximately half of the twisted wire pairs are expected to not function satisfactorily, in part because adjacent stripped conductors are susceptible to shorting. Moreover, even when twisted wire pairs mounted in potting compound are initially functional, they remain susceptible to breaking and shorting at the point of contact with the hardened potting compound when the wires are strained or repeatedly flexed.

Copending U.S. patent application Ser. No. 08/234,253, now U.S. Pat. No. 5,491,300, assigned to the assignee of the present invention discloses a penetrator and flexible circuit assembly which addresses problems described above associated with penetrating the wall of a supercomputer. The maximum data transmission rates possible with such penetrator and flexible circuit assemblies are the maximum transmission speeds of electrical signals through wire, which have certain physical limitations.

Even computers which are not hermetically sealed from the environment in which they operate suffer from signal transmission speed limitation. For example, signal transmission between computers, between nodes of a multi-node network, or between processors of a single system is typically significantly slower than the clock speed of individual processors. Peripheral devices and file servers of the latest computer systems are also effected by latency resulting from delays in signal propagation from the computer to the devices and file servers through conventional cables.

High speed interface amongst computers and devices in local area networks (LANs) and other applications has been achieved with higher speed optoelectronic devices connected via optic fiber or optic fiber bundle in a fiber optic network. However, transmitting signals to and from a computer with such fibers typically require penetration of the computer housing by the fibers, by fiber bundles, or by connectors mounted in the computer housing.

It is against this background that the significant improvements and advancements of the present invention have taken place.

SUMMARY OF THE INVENTION

The present invention offers the capability of transmitting high speed signals to and from a sealed environment without requiring that individual conductors penetrate the sealed environment. In addition the present invention offers the capability of high speed signal transmission between two or more sealed environments without penetration of the sealed environments by individual or bundled conductors.

In accordance with its major aspects, an optical interface of the present invention is mounted to a computer housing adjacent a transparent portion of the housing. High bandwidth optical signals are transmitted and received by the optoelectronic interface across the transparent portion of the housing to and from the computer and external devices. The optical signals transmitted by the present invention which originate with the computer typically represent electrical signals generated by processors and other components in the computer. The optical signals which originate from the external devices also represent previously converted electrical signals generated by the external devices. Optical signals which are received by the computer and the external devices through the optoelectronic interface of the present invention are typically converted after receipt into electrical signals for processing by the computer and external devices.

The optical interface of the present invention includes a transmitter/receiver assembly which is mounted inside the computer. This internal transmitter/receiver includes a transmitter, a transmitter microlens through which optical signals emitted by the transmitter are focused and passed, a receiver having an adjacent receiver microlens through which incoming optical signals are passed, a circuit board to which the transmitter and receiver are attached, and an alignment means for attaching the circuit board to the inside of the computer housing facing the transparent portion of the housing.

In accordance with some of the preferred aspects of the present invention, a second transmitter/receiver assembly is mounted to the outside of the computer housing facing the transparent portion of the housing. This external transmitter/receiver assembly includes a transmitter, transmitter microlens, receiver, receiver microlens and circuit board components like those of the internal transmitter/receiver assembly. The external transmitter/receiver assembly includes an alignment means for attaching the external transmitter/receiver assembly to the outside of the computer housing facing the transparent portion of the housing.

In accordance with some of its preferred aspects, the internal and external transmitter/receiver assemblies of the optical interface of the present invention are each attached to the computer housing by a plurality of locating pins mounted through the housing wall adjacent or through the transparent portion of the housing. The locating pins align the transmitter and receiver of the internal transmitter/receiver assembly with the corresponding receiver and transmitter, respectively, of the external transmitter/receiver assembly. The locating pins are preferably permanently mounted to the housing, thereby maintaining any hermetic seal established between the computer and the external environment.

In accordance with other of its preferred aspects, the transmitter components of the optical interface of the present invention are semiconductor emitting lasers. Preferably, a plurality of such lasers form one or more transmitter arrays mounted to the circuit board of each transmitter/receiver assembly.

In accordance with other of its preferred aspects, an internal transmitter/receiver assembly of the present invention is mounted inside the computer facing the transparent portion of the computer housing and an optic fiber mounting assembly containing an array of optic fibers terminating at a corresponding array of columnating lenses, is mounted to the outside of the computer housing facing the transparent portion of the computer housing. Each optic fiber and columnating lens faces a corresponding transmitter or receiver of the first transmitter/receiver assembly. The transmitter/receiver assembly and the fiber optic mounting assembly are both mounted to the computer housing by locating pins in the computer housing wall. The locating pins serve both to attach the assemblies to the computer housing and to align optic fibers with corresponding transmitters and receivers.

In accordance with another of it major aspects, the present invention includes a method for communicating high communication frequency signals from a computer having elements hermetically enclosed within a housing wall within which fluid under pressure is also confined. The housing wall of the computer has a transparent portion or pane made from glass, plastic, plexiglass or the like. The method comprises the steps of converting high frequency electrical signals from the computer to high bandwidth optical signals, transmitting the optical signals first through a first microlens mounted inside the computer housing, next through the transparent portion of the computer housing, and then through a second microlens mounted outside computer housing opposite the first microlens, and receiving the optical signals at a receiver.

In accordance with other of its preferred aspects, the method further comprises the step of transmitting the optical signal along an elongated optic fiber after the signal is transmitted through the second microlens and before the signal is received at a receiver.

A more complete appreciation of the present invention and its scope can be obtained from understanding the accompanying drawings, which are briefly summarized below, the following detailed description of a presently preferred embodiment of the invention, and the appended claims.

DETAILED DESCRIPTION

Figure 1:
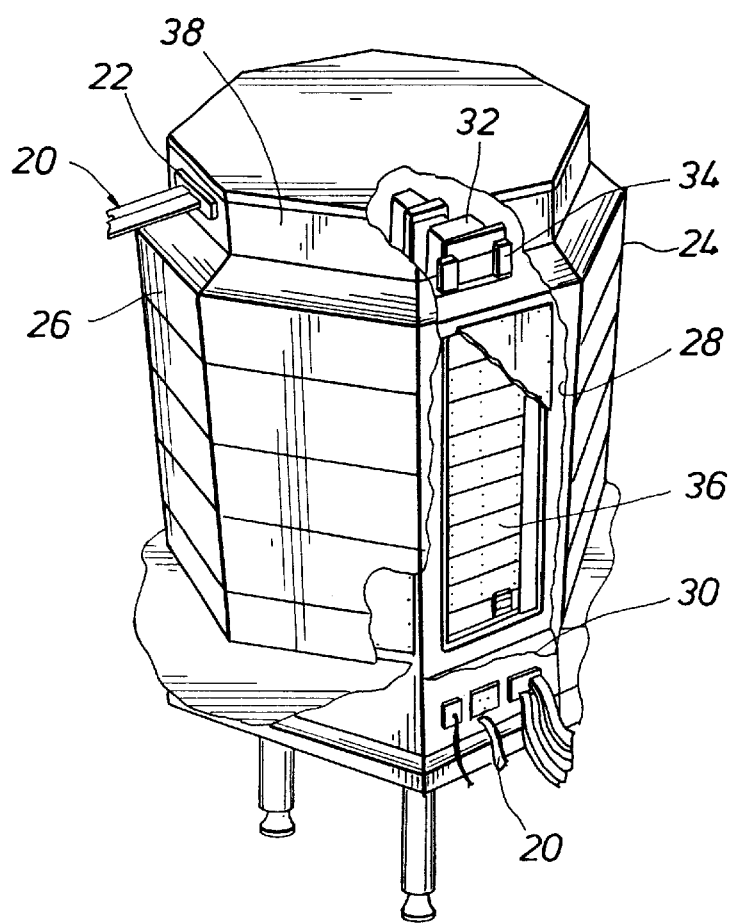
FIG. 1 is a perspective view, with a portion broken out, of a supercomputer utilizing an optical interface incorporating the present invention.
Figure 2:
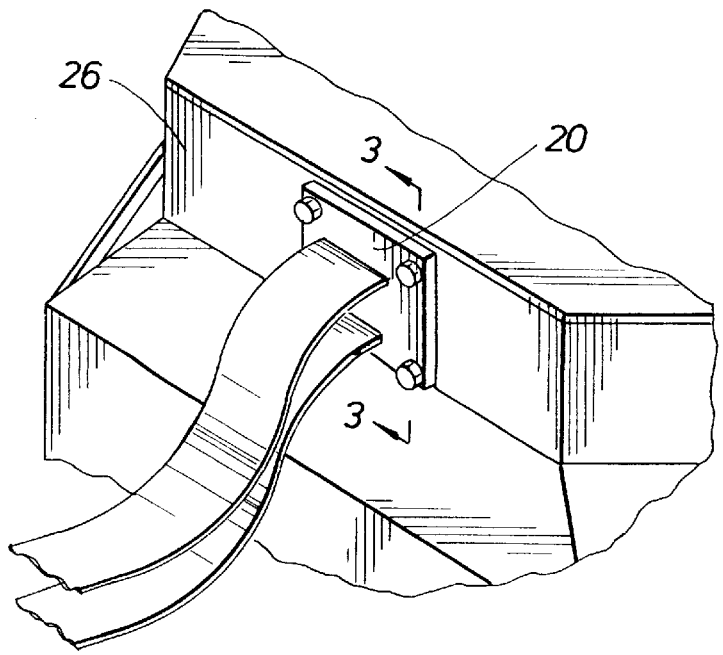
FIG. 2 is an enlarged perspective view of the optical interface and supercomputer shown in FIG. 1.

One presently preferred embodiment of a optical interface 20 for transmitting high bandwidth optical signals to and from a computer, such as a supercomputer 24 in which a hermetically sealed environment is maintained, is shown in FIG. 1.

A shell 26 of the supercomputer 24 divides the interior into an upper compartment 28 and lower compartment 30. Logic, I/O, and memory modules 32 are mounted in the upper compartment 28. A power buss 34 extends between the upper and lower compartments 28 and 30. Mounted in the lower compartment 30 are power supplies 36 which deliver power over the power buss 34 to the modules 32. The upper and lower compartments 28 and 30 are pressurized to maintain a flow of coolant throughout the upper and lower compartments 28 and 30 to dissipate heat generated by the modules 32, the power buss 34 and the power supplies 36.

A portion 22 of the shell 26 is transparent to optical signals of the desired predetermined wavelengths. The transparent portion 22 may be made from glass, plexiglas™, transparent plastic, or the like. Although the transparent portion 22 of the shell 26 shown in FIG. 1 comprises the lid 38 of the shell, it should be understood that the transparent portion 22 shown is only illustrative of how such a transparent portion 22 may be formed in a computer shell, and other configurations, for example, a transparent pane mounted in a frame formed in the shell (not shown), may be used in conjunction with the optical interface of the present invention.

Figure 3:
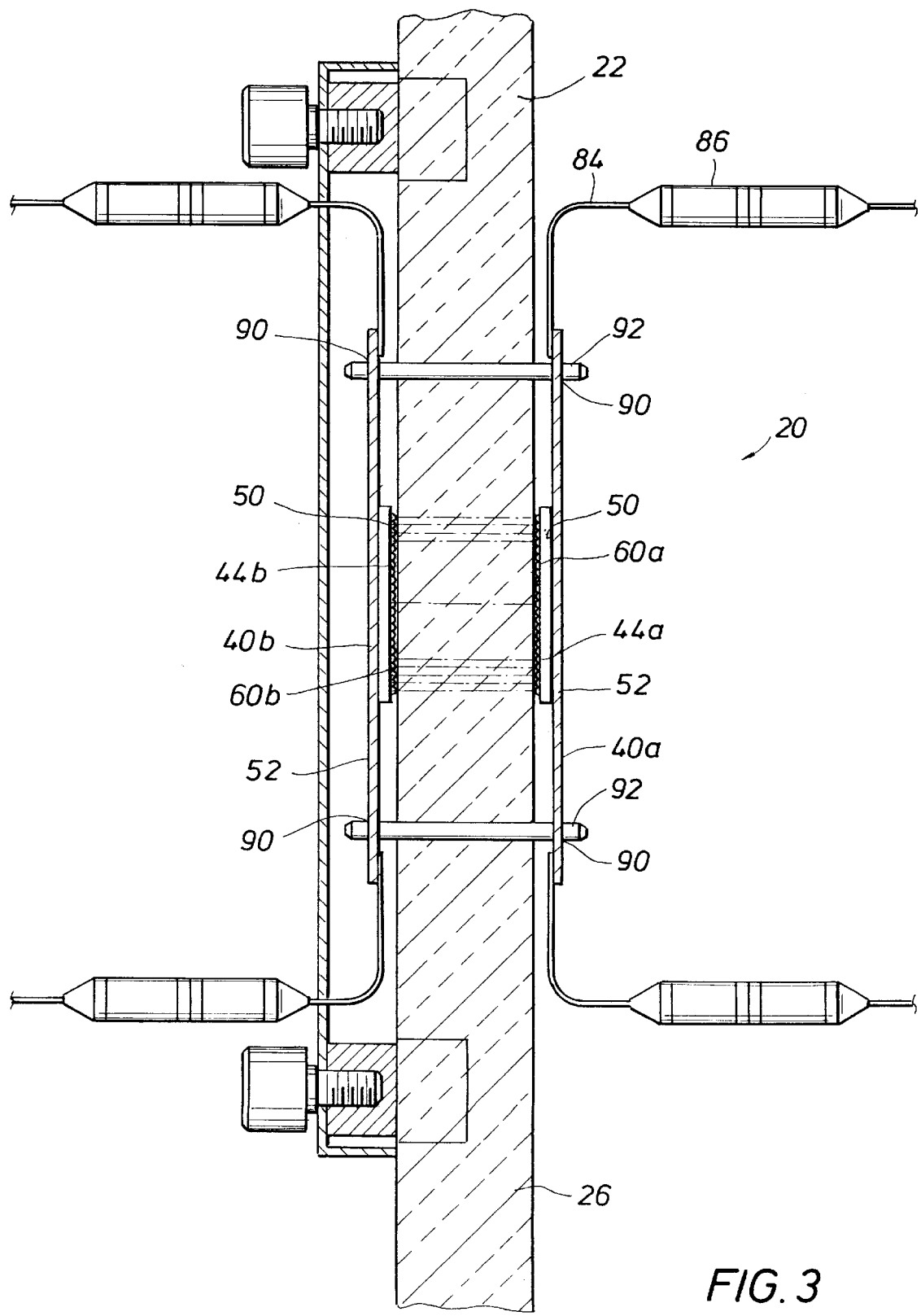
FIG. 3 is a partial enlarged section view of the optical interface taken substantially in the plane of line 3—3 in FIG. 2.
Figure 4:
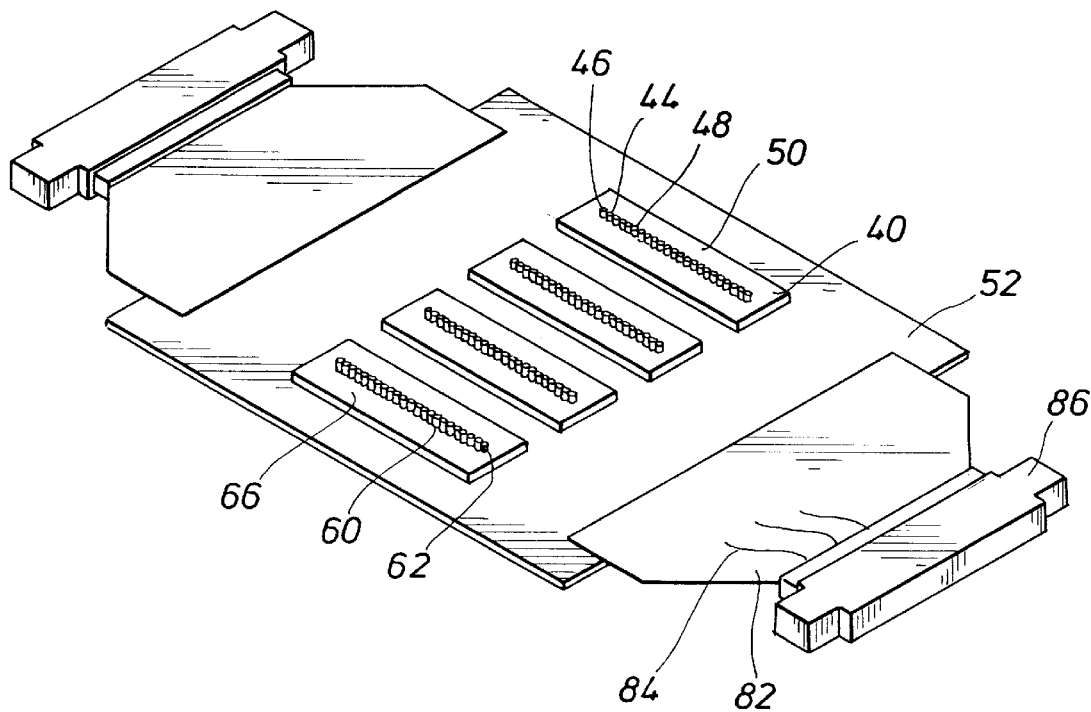
FIG. 4 is a perspective view of a transmitter/receiver assembly component of the optical interface shown in FIGS. 1 through 3.

As best shown in FIGS. 3 and 4, the optical interface 20 includes opposing transmitter/receiver assemblies 40a and 40b (FIG. 3), with assembly 40a mounted internally in the computer 24 and assembly 40b mounted externally to the shell 26 of the computer 24. In the preferred embodiment, the assemblies 40a and 40b are substantially the same. An exemplary transmitter/receiver 40 is shown in FIG. 4, it being understood that the components of transmitter/receiver 40 correspond to like-numbered components of assemblies 40a and 40b to which an "a" or "b" suffix is added, respectively.

The assembly 40 (FIG. 4) includes one or more transmitter 44 grouped to form one or more transmitter arrays 46. In the preferred embodiment, each transmitter 44 is a semiconductor emitting laser capable of transmitting high bandwidth optical signals through a microlens 48 mounted within a transmitter array packaging 50. Gallium arsenic lasers are preferred, with gallium arsenic indium lasers presently most preferred. The transmitter array packaging 50 is mounted in a conventional manner to a printed circuit board 52.

Figure 5:
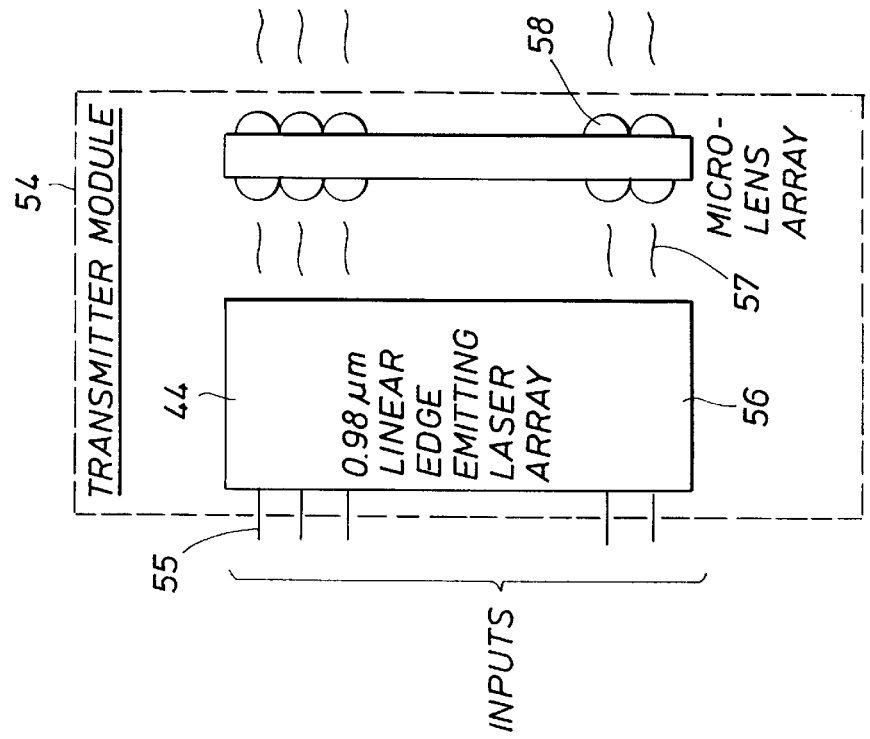
FIG. 5 is a schematic of a transmitter component of the transmitter/receiver assembly component shown in FIG. 4.

As shown in FIG. 5, in the preferred embodiment, each of the transmitters 44 is contained within a transmitter module 54 which converts electrical data signals to optical data signals and transmits the optical data signals. An exemplary transmitter module 54 has been developed in Lexington, Massachusetts at the Lincoln Laboratory of the Massachusetts Institute of Technology. Each transmitter module 54 includes inputs 55 from the circuit board to which it is mounted. In response to electrical signals received through one or more of the inputs 55, a linear edge emitting laser array 56 emits high bandwidth optical signals 57 of a predetermined frequency towards the microlens array 58. The signals 57 are focused as they pass through the microlens array 58. This transmitter module 54 has a preferred interconnect pitch of approximately 0.006 inches and operates at an optical signal transmission rate of approximately 1 gigabit per second (1 Gb/s).

The transmitter/receiver assembly 40 (FIG. 4) of the optical interface 20 also includes one or more receivers 60 mounted to form one or more receiver arrays 62. In the preferred embodiment, each receiver 60 detects high bandwidth signals received through receiver microlens 64 mounted within a receiver array package 66. Each receiver array package 66 is mounted in a conventional manner to the printed circuit board 52.

Figure 6:
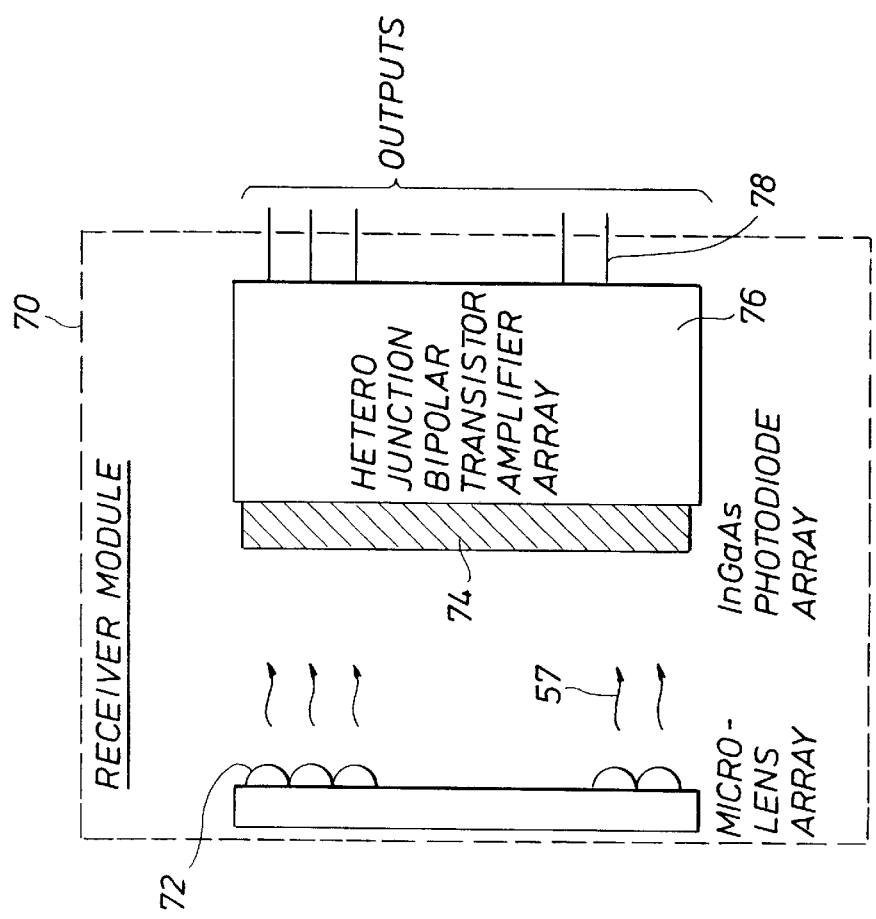
FIG. 6 is a schematic of a receiver component of the transmitter/receiver assembly component shown in FIG. 4.

Each of the receivers 60 is preferably contained within an optoelectronic module 70 which converts optical data signals and transmits electrical data signals. An exemplary receiver module 70 (FIG. 6) has been developed in Lexington, Massachusetts at the Lincoln Laboratory of the Massachusetts Institute of Technology. Each receiver module 70 includes a microlens array 72 through which the optical signals 57 are passed and focused. The signals 57 are introduced into a photodiode array 74, preferably an indium gallium arsenide photodiode array, and passed to a transistor amplifier array 76. The array 76 converts the optical signals 57 to electrical signals which are conducted out outputs 78 to the circuit board to which the receiver module 70 is mounted.

As can be seen in FIG. 4, attached to the opposing edges of the circuit board 52 are one or more flexible cables 82 in which electrically conductive metal trace lines 84 are formed. Each flexible circuit 82 is preferably of a conventional construction, preferably formed as a laminate, with layers of layers of Kapton™ plastic, copper traces 84, acrylic adhesive, and a plastic stiffener/copper shielding laminate, all of which are assembled using conventional manufacturing techniques in which the traces 84 are deposited or otherwise applied to the plastic. The copper shielding layer of the laminate is located in proximity adjacent to the copper traces 84, and thereby establishes a controlled and constant impedance between these two conductors. The controlled impedance allows signals to be conducted over the traces 84 at relatively high frequencies without significantly degrading the essential characteristics of the signals. Each flexible cable 82 terminates in a molded plastic connector 86 to which a coaxial cable connector 88 is attached (FIG. 3).

A plurality of alignment holes 90 are formed in the circuit board 52. Locating pins 92 (FIG. 3) attached to the supercomputer housing wall 26 are inserted through the alignment holes 90 and fixedly mounted thereto.

In the preferred embodiment, as is shown in FIGS. 1 through 4, the transmitter/receiver assemblies 40a and 40b are mounted in opposition to one another, with each semiconductor emitting laser of each transmitter 44a facing and transmitting high bandwidth optical signals across the transparent portion 22 to an opposing receiver 60b, and each semiconductor emitter laser of each transmitter 44b facing and transmitting high bandwidth optical signals across the transparent portion 22 to an opposing receiver 60b.

Precise alignment of the transmitters 44a and 44b with opposing receivers 60b and 60a is required to achieve successful signal transmission to and from the computer 24. Precise alignment of the transmitters 44a and receivers 60b, and the transmitters 44b and receivers 60a is achieved by (1) mounting the transmitters 44a and receivers 60a to the circuit board 52a and the transmitters 44b and receivers 60b to the circuit board 52b in precise, predetermined positions relative to the alignment holes 90; and (2) mounting the circuit boards 52 in precise perpendicular alignment on preferably parallel locating pins 92 mounted through the shell 26 of the supercomputer 24.

Moreover, the distance between each opposing transmitter 44a and receiver 60b and each opposing receiver 60a and transmitter 44b cannot be so great as to lose a significant portion of the signals through signal attenuation and scattering. Such signal degradation is minimized by mounting the transmitter 44a and receiver 60b and the transmitter 44b and receiver 60a at most 7 millimeters (mm) apart, a preferable distance being approximately 6 to 7 mm. This mandates that preferred thickness of the transparent portion 22 of the computer shell 26 not exceed 6 to 7 mm.

The controlled impedance signal transmission characteristics of the flexible cables 82 and the transmission of high bandwidth optical signals together achieve the important advantage of allowing high data communication rates between the computer 24 and the input/output devices connected to the computer. When transmitter and receiver arrays 46a, 46b, 62a and 62b are mounted in arrays of 20 elements each having an interconnect pitch of 0.006 inches and data transmission rates of 1 Gb/s, the arrays can effectively transmit 20 Gb/s by transmitting optical signals in parallel over the arrays.

Figure 7:
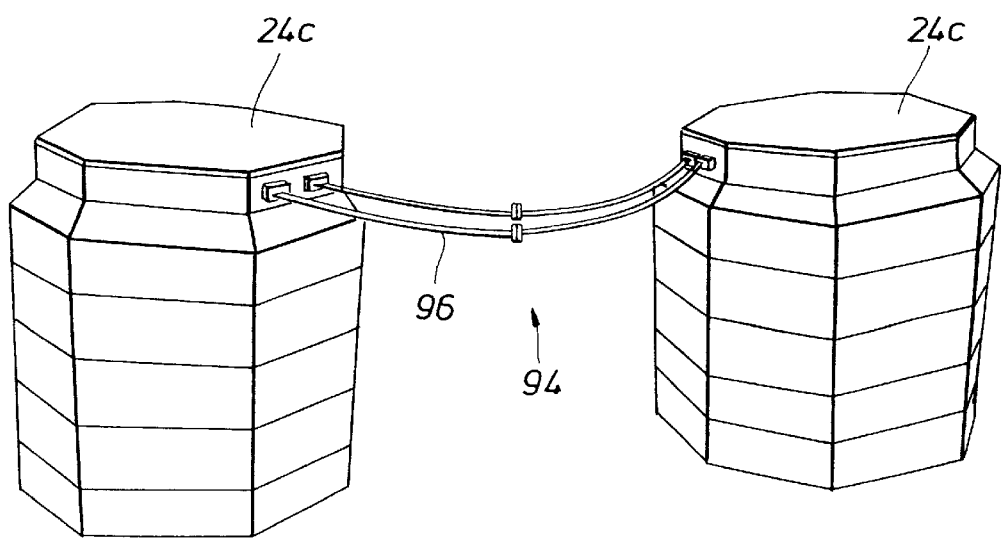
FIG. 7 is a perspective view of a pair of computers to which another embodiment of the optical interface of the present invention is mounted.
Figure 8:
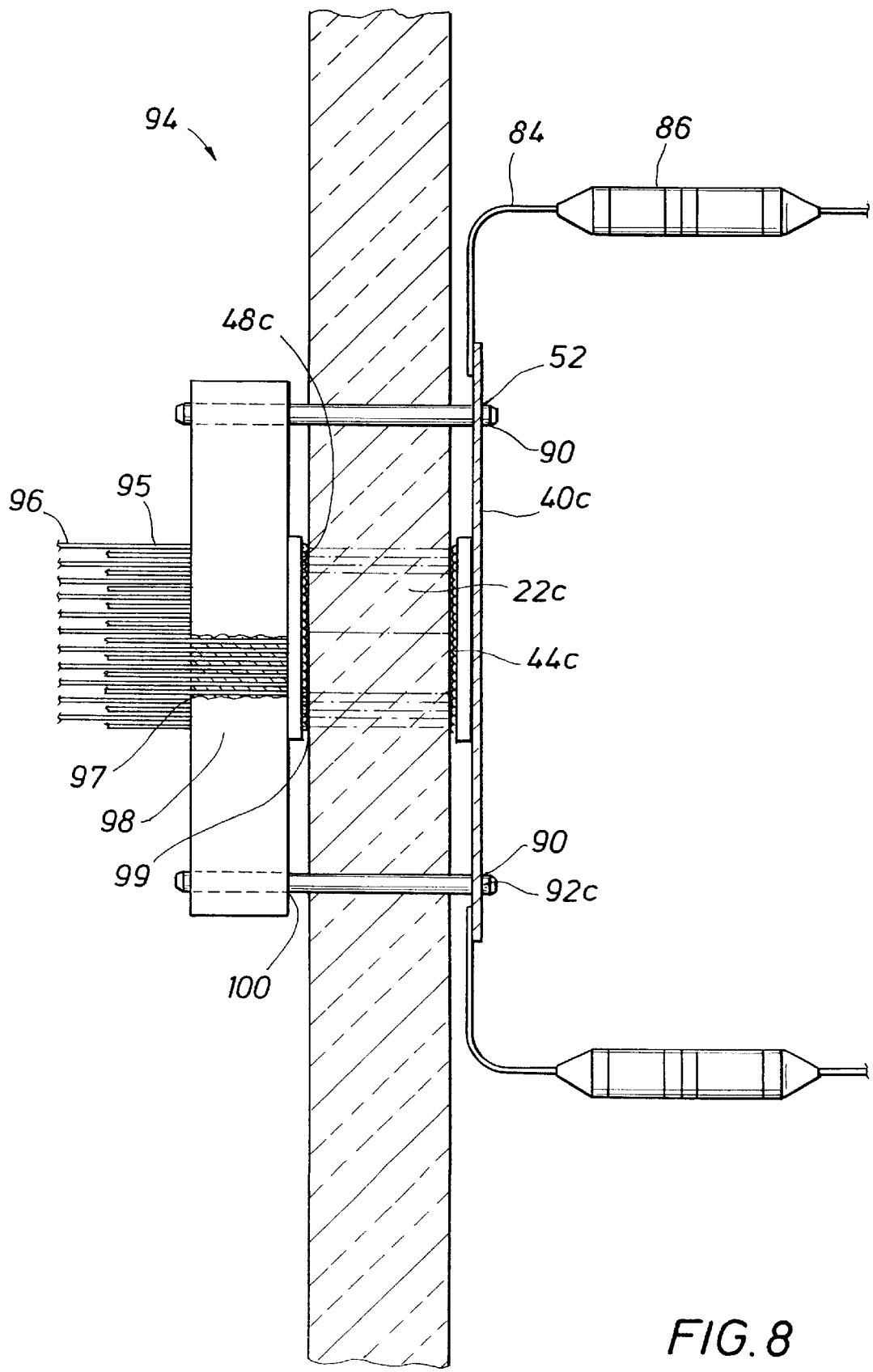
FIG. 8 is a partial enlarged section view of the embodiment of the optical interface of the present invention taken substantially in the plane of line 8—8 in FIG. 7.

Another embodiment 94 of the optical interface is shown in FIGS. 7 and 8. In the embodiment of FIGS. 7 and 8, the optical interface 94 includes an internal transmitter/receiver assembly 40c mounted internally in the supercomputer 24. The components of the assembly 40c correspond in form and function to the components of an assembly 40 (FIG. 4). The previous description herein of the form and function of the components of assembly 40 are applicable to corresponding components of assembly 40c to which a "c" suffix has been added.

Preferably, each of the transmitters 44c is an optoelectronic transmitter module 54 (FIG. 5) which converts electrical data signals to optical data signals and transmit the optical data signals. In response to electrical signals received through one or more of the inputs 55 of the transmitter module 54, the linear edge emitting laser array 56 emits optical signals 57 of a predetermined frequency towards the microlens transmitter array 58. When employed in the transmitter/receiver assembly 40c, the transmitter modules 54 described herein employ a preferred interconnect pitch of approximately 0.006 inches and operate at an optical signal transmission rate of approximately 1 gigabit per second (1 Gb/s).

Each of the receivers of the assembly 40c is preferably an optoelectronic receiver module 70 (FIG. 6) which converts optical data signals and transmits electrical data signals. As described above, each receiver module 70 includes a microlens array 72 through which the high bandwidth optical signals 57 are passed and focused. The signals 57 are introduced into a photodiode array 74, preferably an indium gallium arsenide photodibde array, and passed to a transistor amplifier array 76. The optical signals 57 to are converted to electrical signals which are conducted out outputs 78 to the circuit board to which the receiver module 70 is mounted.

The optical interface 94 of the present invention also includes a fiber assembly 95 mounted to the outside of a supercomputer 24c facing a transparent portion 22c. The fiber assembly 95 includes one or more conventional elongated optic fibers 96, each of which is inserted through a corresponding fiber retaining hole 97 formed in a fiber mounting assembly 98. The optic fibers 96 are held in place in the fiber mounting assembly 98 by any of any number of conventional techniques, for example, with an adhesive. Each of the optic fibers 96 terminates at a columnating lens 99.

A plurality of mounting holes 100 are formed in the fiber mounting assembly 98. Each of the holes 100 correspond to one of the locating pins 92c mounted to the computer shell 26c.

When the optical interface 94 is mounted to a computer 24c, each microlens 48c of the transmitter/receiver assembly 40c faces a corresponding columnating lens 99 of the fiber assembly 95 through the transparent portion 22c of the computer 24c. Optical signals emitted by a transmitter 44c pass through a transmitter microlens 48c, across the transparent portion 22c of the computer 24c, through a corresponding columnating lens 99 and into the optic fiber 96 which terminates at that columnating lens 99. The signal is received at a receiving device (not shown) at or beyond an opposite end of the optic fiber 96.

Optical signals emitted by transmitters (not shown) distant to the computer system 24c are passed through other of the optic fibers 96. Such signals traveling along the optic fiber 96 pass through a corresponding columnating lens 99, across the transparent portion 22c of the computer 24c, through a corresponding receiver microlens, and into the corresponding receiver. The optic signal is then translated into an electric signal for subsequent processing by the processors (not shown) of the computer 24c.

The distance between the columnating lenses 99 and opposing the transmitters 44c and receivers 60c of the assembly 40c is preferably from approximately 6 to 7 millimeters. Accordingly, the preferred thickness of the transparent portion 22c of the computer shell 26c is at most approximately 7 millimeters.

The controlled impedance signal transmission characteristics of the flexible cables 82c of the assembly 40c and tie transmission of high bandwidth optical signals traveling along the optic fibers 96 together achieve the important advantage of allowing high data communication rates between the computer 24c and the input/output devices connected to the computer 24c or between the computer 24c and other computers or file servers. Moreover, when transmitter and receiver arrays 46c and 62c containing 20 elements each are used having an interconnect pitch of 0.006 inches and data transmission rates of 1 Gb/s, the arrays can effectively transmit 20 Gb/s by transmitting optical signals in parallel over the array.

Presently preferred embodiments of the present invention and many of its improvements have been described with a degree of particularity. It should be understood that the present invention is defined not by this detailed description but by the scope of the following claims.

The invention claimed is:

1. An optical interface apparatus for transmitting optical signals between two environments separated by a wall having a transparent portion between opposing first and second sides, said apparatus comprising:

a first circuit board;

a first plurality of first transmitters for transmitting optical signals, the first plurality of first transmitters forming a first transmitter array located at a predetermined position on the first circuit board;

a first plurality of first receivers for receiving optical signals, the first plurality of first receivers forming a first receiver array located at a predetermined position on the first circuit board;

a second circuit board;

a second plurality of second transmitters for transmitting optical signals, the second plurality of second transmitters forming a second transmitter array located at a predetermined position on the second circuit board;

a second plurality of second receivers for receiving optical signals, the second plurality of second receivers forming a second receiver array located at a predetermined position on the second circuit board;

a plurality of locating pins attached to the wall extending from the first and second sides of the wall at predetermined positions; and a plurality of holes formed in each of the first and second circuit boards at predetermined positions, the holes receiving the locating pins to attach the first circuit board to the first side of the wall and the second circuit board to the second side of the wall with the transmitter and receiver arrays of the first and second circuit boards facing each other across the transparent portion of the wall, the facing relationship of the transmitter and receiver arrays and the predetermined positions of the pins, holes and arrays aligning the first transmitters of the first transmitter array with the second receivers of the second receiver array for communicating optical signals therebetween through the transparent portion of the wall and also aligning the second transmitters of the second transmitter array with the first receivers of the first receiver array for communicating optical signals therebetween through the transparent portion of the wall; and wherein:

each first transmitter of the first transmitter array, each first receiver of the first receiver array, each second transmitter of the second transmitter array and each second receiver of the second receiver array has an interconnect pitch of approximately 0.006 inches and is capable of transmitting optical signals at a data transmission rate of up to 1 Gb/s.

2. An optical interface apparatus for transmitting optical signals between two environments separated by a wall having a transparent portion between opposing first and second sides, said apparatus comprising:

a first circuit board;

a first plurality of first transmitters for transmitting optical signals, the first plurality of first transmitters forming a first transmitter array located at a predetermined position on the first circuit board;

a first plurality of first receivers for receiving optical signals, the first plurality of first receivers forming a first receiver array located at a predetermined position on the first circuit board;

a second circuit board;

a second plurality of second transmitters for transmitting optical signals, the second plurality of second transmitters forming a second transmitter array located at a predetermined position on the second circuit board;

a second plurality of second receivers for receiving optical signals, the second plurality of second receivers forming a second receiver array located at a predetermined position on the second circuit board;

a plurality of locating pins attached to the wall extending from the first and second sides of the wall at predetermined positions; and a plurality of holes formed in each of the first and second circuit boards at predetermined positions, the holes receiving the locating pins to attach the first circuit board to the first side of the wall and the second circuit board to the second side of the wall with the transmitter and receiver arrays of the first and second circuit boards facing each other across the transparent portion of the wall, the facing relationship of the transmitter and receiver arrays and the predetermined positions of the pins, holes and arrays aligning the first transmitters of the first transmitter array with the second receivers of the second receiver array for communicating optical signals therebetween through the transparent portion of the wall and also aligning the second transmitters of the second transmitter array with the first receivers of the first receiver array for communicating optical signals therebetween through the transparent portion of the wall; and wherein:

each of the transmitters and receivers includes a microlens through which the optical signals pass;

the microlens of each first transmitter of the first transmitter array and the microlens of each aligned second receiver of the second receiver array, and the microlens of each first receiver of the first receiver array and the microlens of each aligned second transmitter of the second transmitter array, are separated from one another by a distance of from approximately 6 to 7 millimeters.

3. An optical interface apparatus for transmitting optical signals between two environments separated by a wall having a transparent portion between opposing first and second sides, said apparatus comprising:

a first circuit board;

a first plurality of first transmitters for transmitting optical signals, the first plurality of first transmitters forming a first transmitter array located at a predetermined position on the first circuit board;

a first plurality of first receivers for receiving optical signals, the first plurality of first receivers forming a first receiver array located at a predetermined position on the first circuit board;

a second circuit board;

a first plurality of elongated first optic fibers, each of the first optic fibers of the first plurality terminating in a first columnating lens, each of the first plurality of first optic fibers and first columnating lenses transmitting optical signals, the first plurality of first optic fibers and first columnating lenses forming a second transmitter array located at a predetermined position on the second circuit board;

a second plurality of elongated second optic fibers, each of the second optic fibers of the second plurality terminating in a second columnating lens, each of the second optic fibers and second columnating lenses of the second plurality receiving optical signals, the second plurality of second optic fibers and second columnating lenses forming a second receiver array located at a predetermined position on the second circuit board;

a plurality of locating pins attached to the wall extending from the first and second sides of the wall at predetermined positions; and a plurality of holes formed in each of the first and second circuit boards at predetermined positions, the holes receiving the locating pins to attach the first circuit board to the first side of the wall and the second circuit board to the second side of the wall with the transmitter and receiver arrays of the first and second circuit boards facing each other across the transparent portion of the wall, the facing relationship of the transmitter and receiver arrays and the predetermined positions of the pins, holes and arrays aligning the first transmitters of the first transmitter array with the second optic fibers and second columnating lenses of the second receiver array for communicating optical signals therebetween through the transparent portion of the wall and also aligning the first optic fibers and first columnating lenses of the second transmitter array with the first receivers of the first receiver array for communicating optical signals therebetween through the transparent portion of the wall; and wherein:

each first transmitter of the first transmitter array, each first receiver of the first receiver array, each first optic fiber and first columnating lens of the second transmitter array, and each second optic fiber and second columnating lens of the second receiver array has an interconnect pitch of approximately 0.006 inches and is capable of transmitting optical signals at a data transmission rate of up to 1 Gb/s.

4. An optical interface apparatus as defined in claim 3 wherein:

each first transmitter of the first transmitter array and each first receiver of the first receiver array includes a microlens; and each columnating lens of the second receiver array and each aligned microlens of the first transmitter array and each columnating lens of the second transmitter array and each associated microlens of the first receiver array are separated from one another across the wall by a distance of from approximately 6 to 7 millimeters.

5. An optical interface apparatus as defined in claim 1, wherein:

each of the transmitters and receivers includes a microlens through which the optical signals pass.

6. An optical interface apparatus as defined in claim 5, wherein:

the microlens of each transmitter and the microlens of each aligned receiver are separated from one another by a distance of at least 6 millimeters.

7. An optical interface apparatus as defined in claim 1, wherein:

the wall is part of a shell of a hermetically sealed computer, and the interior of the shell of the computer contains cooling fluid for cooling the computer.

8. An optical interface apparatus as defined in claim 2, wherein:

the wall is part of a shell of a hermetically sealed computer, and the interior of the shell of the computer contains cooling fluid for cooling the computer.

9. An optical interface apparatus as defined in claim 2, wherein:

the transmitters and receivers of the arrays are capable of transmitting optical signals at a data transmission rate of 1 Gb/s.

10. An optical interface apparatus as defined in claim 3, wherein:

each transmitter of the first transmitter array and each receiver of the first receiver array includes a microlens through which the optical signals pass.

11. An optical interface apparatus as defined in claim 10, wherein:

the first columnating lens of each first optic fiber of the second transmitter array and the microlens of each aligned first receiver of the first receiver array are separated from one another by a distance of at least 6 millimeters; and the second columnating lens of each second optic fiber of the second receiver array and the microlens of each aligned first transmitter of the first transmitter array are separated from one another by a distance of at least 6 millimeters.

12. An optical interface apparatus as defined in claim 3, wherein:

the wall is part of a shell of a hermetically sealed computer, and the interior of the shell of the computer contains cooling fluid for cooling the computer.

13. An optical interface apparatus as defined in claim 4, wherein:

the wall is part of a shell of a hermetically sealed computer, and the interior of the shell of the computer contains cooling fluid for cooling the computer.

* * * * *